(12) United States Patent  
Bollegraaf

(10) Patent No.: US 6,702,104 B2
(45) Date of Patent: Mar. 9, 2004

(54) CONVEYOR FOR CONVEYING BULK MATERIAL

(75) Inventor: Heiman Salle Bollegraaf, Groningen (NL)

(73) Assignee: Machinefabriek Bollegraaf Appingedam B.V., Appingedam (NL)

(*) Notice: Subject to any disclaimer, the term of this patent is extended or adjusted under 35 U.S.C. 154(b) by 0 days.

(21) Appl. No.: 09/837,361

(22) Filed: Apr. 18, 2001

(65) Prior Publication Data

US 2001/0037930 A1 Nov. 8, 2001

(30) Foreign Application Priority Data

Apr. 18, 2000 (EP) .............................. 00201401

(51) Int. Cl.⁷ .............................................. G65G 17/10
(52) U.S. Cl. ..................................... 198/822; 198/836.1
(58) Field of Search ................. 198/820, 821, 198/822, 836.1, 836.4

(56) References Cited

U.S. PATENT DOCUMENTS

| | | | |
|---|---|---|---|
| 216,813 A | 6/1879 | Whitaker | |
| 513,089 A | 1/1894 | Crockett | |
| 530,262 A | 12/1894 | Distl et al. | |
| 785,508 A | 3/1905 | Mason | |
| 1,621,695 A | 3/1927 | Tuite et al. | |
| 1,641,777 A | 9/1927 | Newhouse | |
| 1,679,593 A | 8/1928 | Williamson et al. | |
| 1,699,718 A | 1/1929 | Robins | |
| 1,941,147 A | 12/1933 | Johlige | |
| 2,114,237 A | * 4/1938 | Pink | 198/820 |
| 2,121,298 A | * 6/1938 | Komarek | 198/820 |
| 2,124,856 A | 7/1938 | Kohler | |
| 2,266,506 A | 12/1941 | Morse | |
| 2,370,539 A | 2/1945 | Hodecker | |
| 2,417,921 A | 3/1947 | Fox | |
| 2,588,309 A | 3/1952 | Troyer | |
| 2,743,813 A | 5/1956 | Erickson | |
| 2,860,766 A | 11/1958 | Welter | |
| 2,949,189 A | 8/1960 | Haines | |
| 2,983,376 A | 5/1961 | Troyer | |
| 3,279,588 A | * 10/1966 | Andrews | 198/822 |
| 3,306,441 A | 2/1967 | Sanders et al. | |

(List continued on next page.)

FOREIGN PATENT DOCUMENTS

| | | |
|---|---|---|
| CA | 2054615 | 1/1999 |
| DE | 592 126 | 1/1934 |
| DE | 609 919 | 2/1935 |
| DE | 618 154 | 8/1935 |
| DE | 2 012 654 | 12/1971 |

(List continued on next page.)

OTHER PUBLICATIONS

"B.H.S. OCC/Paper Separator OCC & Office Paper," Bulk Handling Systems, Inc., Eugene, Oregon, 2 pages (date unknown).
Beitz, W. et al., "Taschenbuch für den Maschinenbau," *Dubbel*, pp. 367 and 405 (1986).
"Trennen fester Stoffe von festen Stoffen; Sortieren," *IPC*, Bd. 2. Sektion B, pp. 41–42 (Aug. 6, 1994).

*Primary Examiner*—Douglas Hess
(74) *Attorney, Agent, or Firm*—Pearne & Gordon LLP

(57) ABSTRACT

A conveyor for conveying bulk material includes a conveyor loop (2) having an upper section forming a transport deck (5) extending along a transport path and a lower return section. The conveyor loop (2) includes an array of pins (7) and connections (8, 9) interconnecting the pins (7) and an array of carrier beams (10) each extending transverse to the array of pins (7) and connections (8, 9). A side barrier (11) above and along a side of the transport deck (5) for restraining bulk material from moving laterally off the is formed by an array of side barrier plates (24; 124). The side barrier plates (24; 124) are each fixedly connected relative to axes (35) of a pair of the pins (7). Leading and trailing ends (36) of successive side barrier plates (24; 124) are in at least close proximity of each other.

17 Claims, 9 Drawing Sheets

U.S. PATENT DOCUMENTS

| | | | |
|---|---|---|---|
| 3,367,494 A | | 2/1968 | Peterson |
| 3,519,129 A | | 7/1970 | Peterson |
| 3,537,572 A | * | 11/1970 | Scherfel ................. 198/822 |
| 3,554,361 A | * | 1/1971 | Keough ................. 198/821 |
| 3,642,520 A | | 2/1972 | Lazzarini |
| 3,718,249 A | * | 2/1973 | Hess ................. 198/822 |
| 3,866,743 A | | 2/1975 | Jorgensen |
| 3,870,627 A | | 3/1975 | Herkes |
| 4,037,723 A | | 7/1977 | Wahl et al. |
| 4,128,166 A | | 12/1978 | Kovats |
| 4,301,903 A | | 11/1981 | Nakano |
| 4,301,930 A | | 11/1981 | Smith |
| 4,402,390 A | | 9/1983 | Feeney |
| 4,539,734 A | | 9/1985 | Messerschmitt |
| 4,542,821 A | | 9/1985 | Livermore |
| 4,600,106 A | | 7/1986 | Minardi |
| 4,653,648 A | | 3/1987 | Bielagus |
| 4,674,627 A | | 6/1987 | Dussan V. Benlcio I. |
| 4,724,950 A | | 2/1988 | Okamura |
| 4,729,471 A | * | 3/1988 | Tuns et al. ................. 198/822 |
| 4,795,036 A | | 1/1989 | Williams |
| 4,836,388 A | | 6/1989 | Bielagus |
| 4,855,039 A | | 8/1989 | Genev |
| 4,858,180 A | | 8/1989 | Murdoch |
| 4,901,864 A | | 2/1990 | Daugherty |
| 4,909,381 A | | 3/1990 | Stohr |
| 4,991,710 A | * | 2/1991 | Imatomo ................. 198/822 |
| 5,007,528 A | * | 4/1991 | Hideharu ................. 198/823 |
| 5,032,255 A | | 7/1991 | Jauncey |
| 5,035,314 A | | 7/1991 | Kornylak |
| 5,051,172 A | | 9/1991 | Gilmore |
| 5,060,806 A | | 10/1991 | Savage |
| 5,163,564 A | | 11/1992 | Matula |
| 5,193,454 A | | 3/1993 | Bollegraaf |
| 5,232,097 A | | 8/1993 | Tohkala |
| 5,249,690 A | | 10/1993 | Patterson |
| 5,255,597 A | | 10/1993 | Vos |
| 5,279,427 A | | 1/1994 | Mobley |
| 5,328,034 A | | 7/1994 | Davis |
| 5,341,937 A | | 8/1994 | Vos |
| 5,352,469 A | | 10/1994 | Peters |
| 5,361,909 A | | 11/1994 | Gemmer |
| 5,450,966 A | | 9/1995 | Clark et al. |
| 5,452,804 A | | 9/1995 | Davis |
| 5,480,034 A | | 1/1996 | Kobayashi |
| 5,484,247 A | | 1/1996 | Clark et al. |
| 5,551,573 A | | 9/1996 | Davis |
| 5,667,079 A | | 9/1997 | Jongebloed |
| 5,697,704 A | | 12/1997 | Coyle |
| 5,722,542 A | | 3/1998 | Davis |
| 5,799,801 A | | 9/1998 | Clark et al. |
| 5,832,815 A | | 11/1998 | Bollegraaf |
| 5,868,036 A | | 2/1999 | Salzman |
| 5,894,934 A | | 4/1999 | Davis |
| 5,901,856 A | | 5/1999 | Brantley, Jr. et al. |
| 5,931,312 A | | 8/1999 | Gifford |
| 5,960,964 A | | 10/1999 | Austin et al. |
| 6,076,684 A | | 6/2000 | Bollegraaf |
| 6,149,018 A | | 11/2000 | Austin et al. |
| 6,196,380 B1 | * | 3/2001 | Teuber et al. ................. 198/853 |
| 6,234,322 B1 | | 5/2001 | Paladin |
| 6,250,478 B1 | | 6/2001 | Davis |
| 6,318,560 B2 | | 11/2001 | Davis |

FOREIGN PATENT DOCUMENTS

| | | |
|---|---|---|
| DE | 2 015 911 | 2/1972 |
| DE | 37 23 591 | 7/1987 |
| DE | 89 06 721.5 | 8/1989 |
| DE | 40 12 802 A1 | 2/1991 |
| DE | 39 26 451 C1 | 3/1991 |
| DE | 44 15 815 A1 | 11/1995 |
| EP | 0 034 980 A1 | 9/1981 |
| EP | 0 132 217 A2 | 1/1985 |
| EP | 0 773 070 A1 | 5/1997 |
| EP | 0 849 006 A2 | 6/1998 |
| FR | 924.266 | 7/1974 |
| GB | 2 222 787 A | 3/1990 |
| GB | 2 323 910 A | 10/1998 |
| NL | 9001005 | 11/1991 |
| WO | WO 94/26427 | 11/1994 |
| WO | WO 95/35168 | 12/1995 |
| WO | WO 00/45966 | 8/2000 |

* cited by examiner

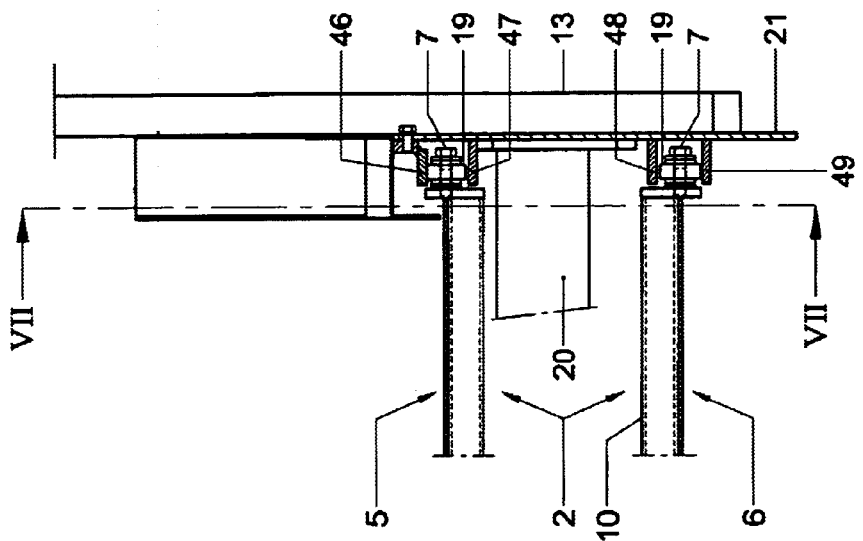
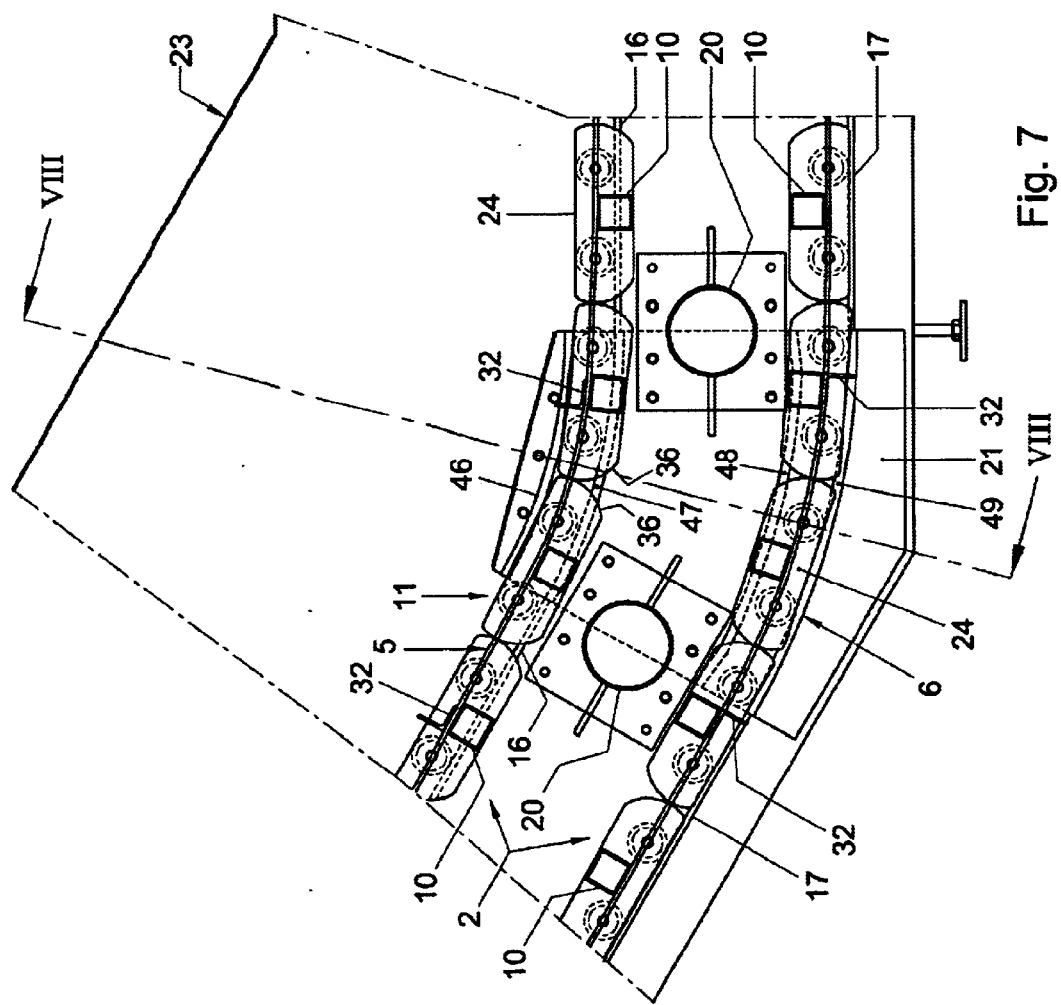

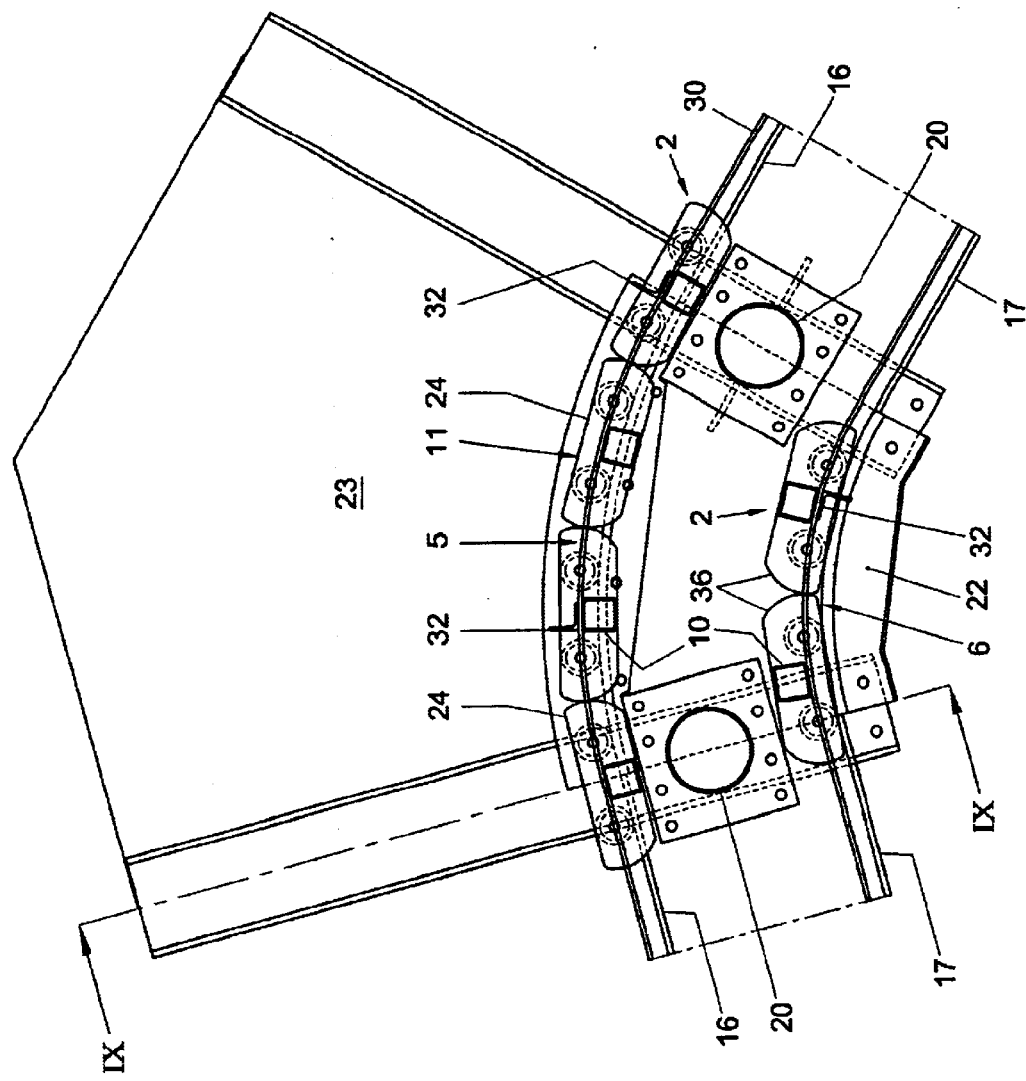
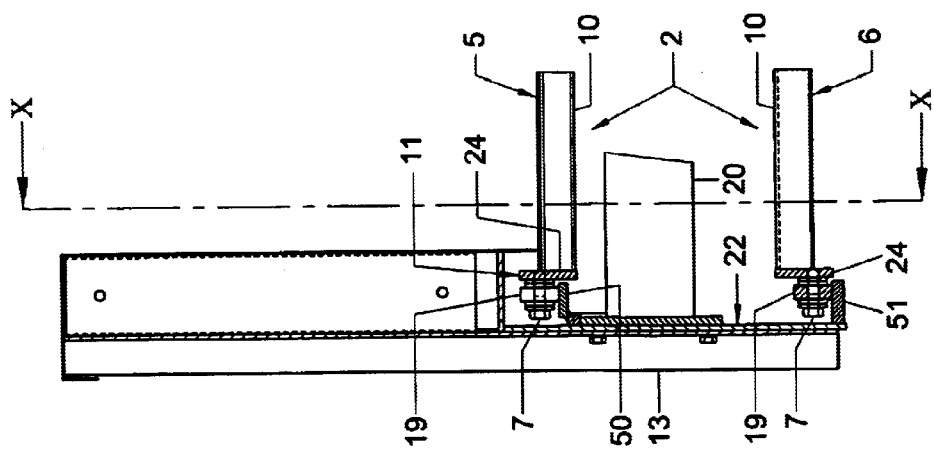

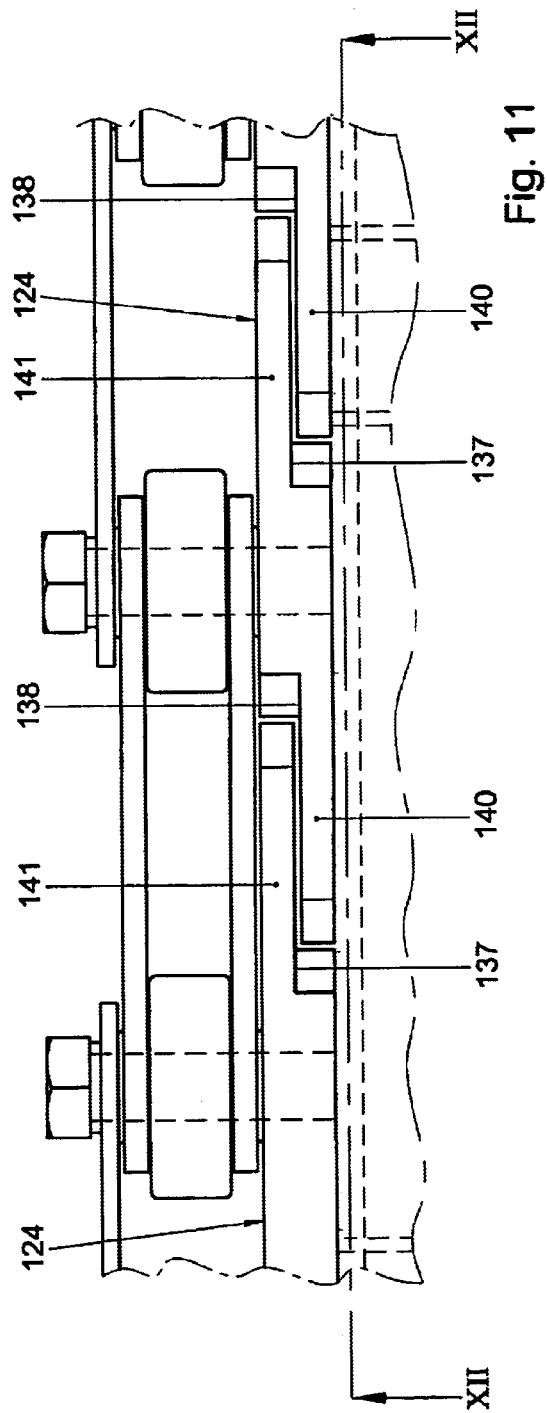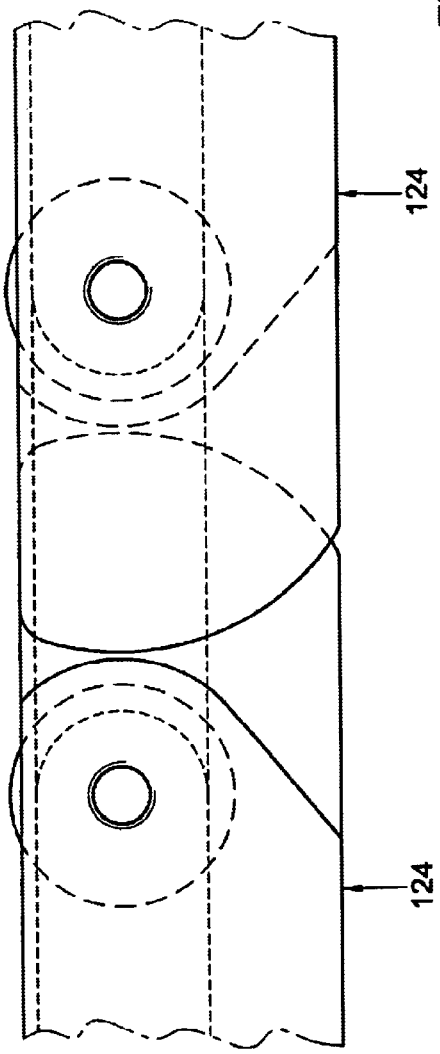

CONVEYOR FOR CONVEYING BULK MATERIAL

TECHNICAL FIELD

The invention relates to a conveyor for conveying bulk material, such as waste paper and cardboard, plastic or glass to be recycled, along a transport path.

BACKGROUND ART

In conveyors for transporting bulk material generally provisions are made to keep bulk material on the transport deck, such as waste paper and cardboard, plastic or glass to be recycled, from falling over the side of the transport deck.

One known solution to keep material on the transport deck from falling over the side of the transport deck is to provide flexible strips suspended above the transport deck closely inside side edges of the transport deck. A problem of such flexible strips is that the strips wear quickly and that substantial amounts of material pass under the strips and fall over the side of the transport deck causing soiling and wear of the guiding mechanism. Moreover friction between the strips and the transport deck reduce the energy efficiency of the conveyor.

It is also known to provide belt conveyors having a transport deck in the form of a trough. However, this requires special measures to keep the side portions of the belt lifted and, if the sloping angle of the belt changes in the course of the transport path, to allow the lifted side portions of the belt to accommodate to such changes in the sloping angle of the belt.

SUMMARY OF THE INVENTION

It is an object of the present invention to provide an effective and durable solution for keeping material from falling over the side of conveyor.

According to the present invention, this object is achieved by providing a conveyor for conveying bulk material including a conveyor loop having a momentarily upper section forming a transport deck extending along a transport path and a momentarily lower return section extending under the transport deck. The conveyor loop includes at least one array of pins transverse to the array and connections extending in longitudinal direction of the array and interconnecting the pins and an array of carrier beams each extending transverse to the array of pins and connections. At least one side barrier extends above and along a side of the transport deck for keeping bulk material from falling over a side edge of the transport deck. The side barrier is formed by an array of side barrier plates, the side barrier plates each being fixedly connected relative to axes of a pair of successive ones of the pins, and leading and trailing end portions of successive ones of the side barrier plates being in at least close proximity of each other for keeping bulk material from passing in-between the end portions.

Because the side barrier is formed by an array of side barrier plates, the side barrier plates each being fixedly connected relative to axes of a pair of the pins, and leading and trailing end portions of successive ones of the side barrier plates are in at least close proximity of each other for keeping bulk material from passing in-between the end portions, bulk material is kept from falling over a side edge of the transport deck.

In operation, the side barrier plates move along with the conveyor loop. Accordingly, friction and wear between, on the one hand, the conveyor loop and material transported thereby and, on the other hand, the barrier are substantially prevented. Because the ends of successive barrier elements facing each other are in at least close proximity, material is restrained from between successive end portions of successive side barrier elements in a simple manner.

Further objects, modes, embodiments and details of the invention appear from the dependent claims and the description in which reference is made to the drawings.

BRIEF DESCRIPTION OF THE DRAWINGS

FIG. 7 is a partial side view in cross-section along the line VII—VII in FIG. 8;

FIG. 8 is a partial frontal view in cross-section along the lines VIII—VIII in FIGS. 1 and 7;

FIG. 9 is a partial frontal view in cross-section along the lines IX—IX in FIGS. 1 and 10;

FIG. 10 is a partial side view in cross-section along the lines X—X in FIG. 9,

FIG. 11 is a top plan view of a side portion of a transport deck of a conveyor according to an alternative embodiment of the present invention; and FIG. 12 is a partial side view in cross-section along the line XII—XII in FIG. 11.

DETAILED DESCRIPTION

Figure 1:
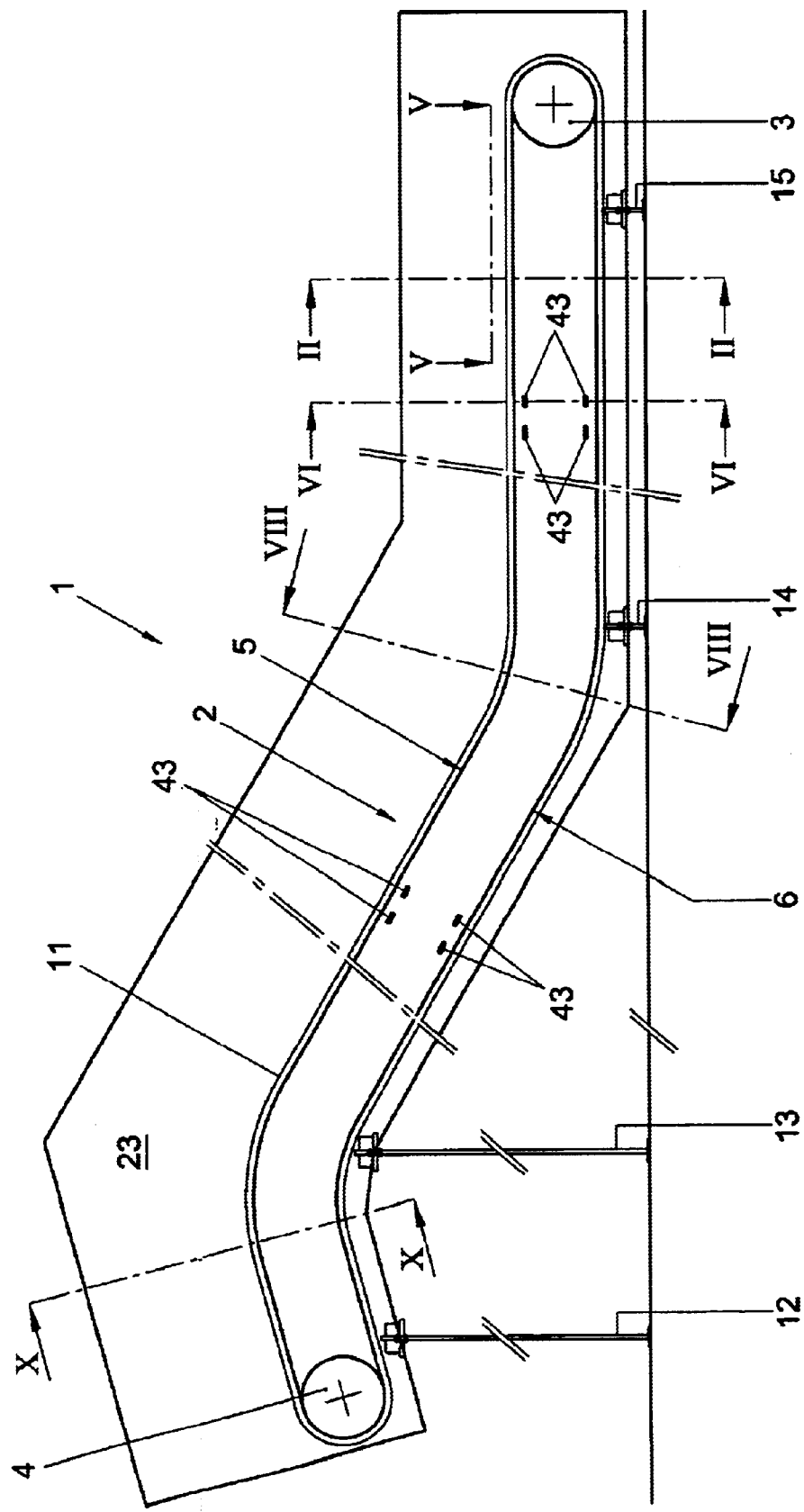
FIG. 1 is a schematic representation in side view of an example of a conveyor according to the present invention.
Figure 2:
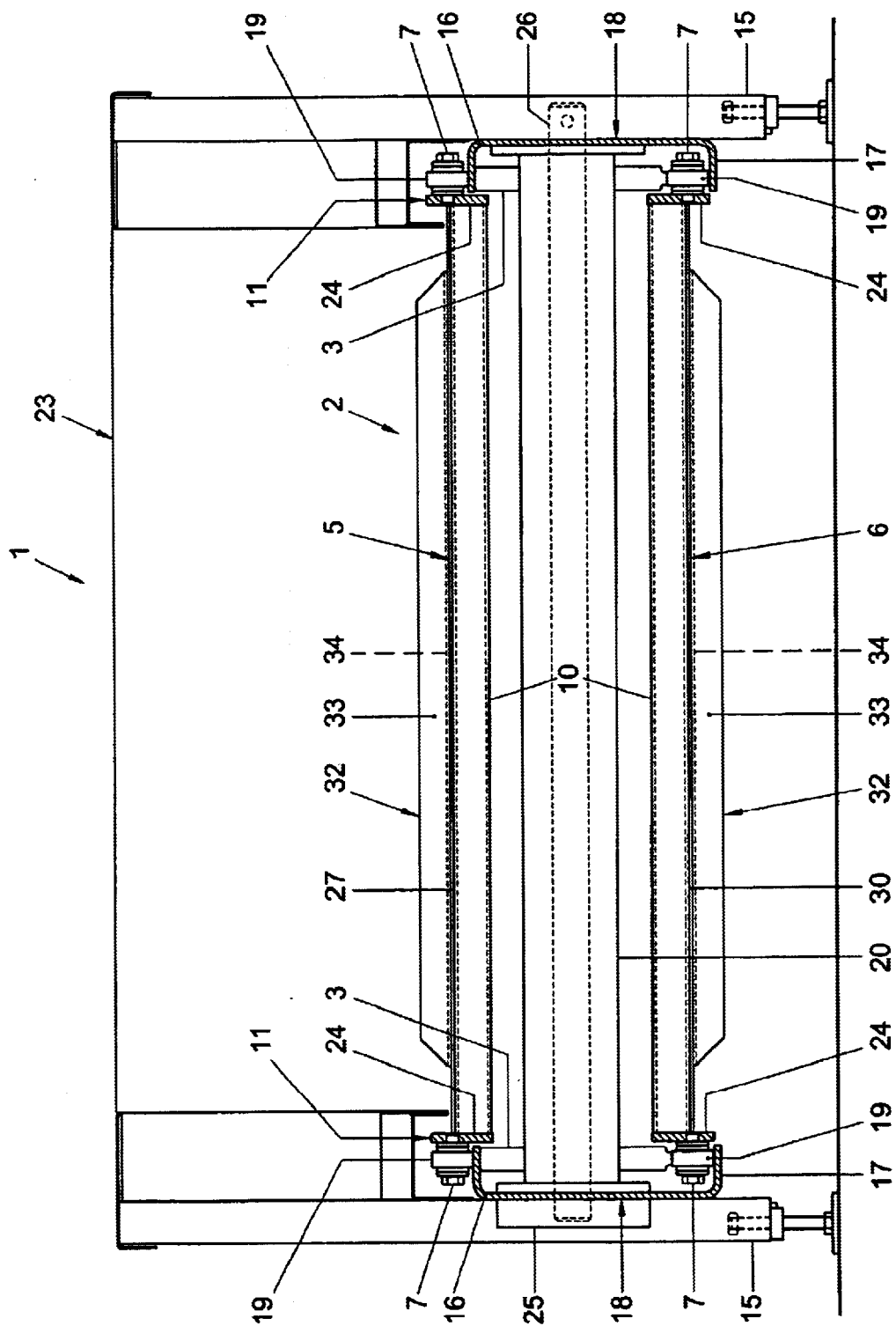
FIG. 2 is a more detailed view in cross-section along the line II—II in FIG. 1.
Figure 3:
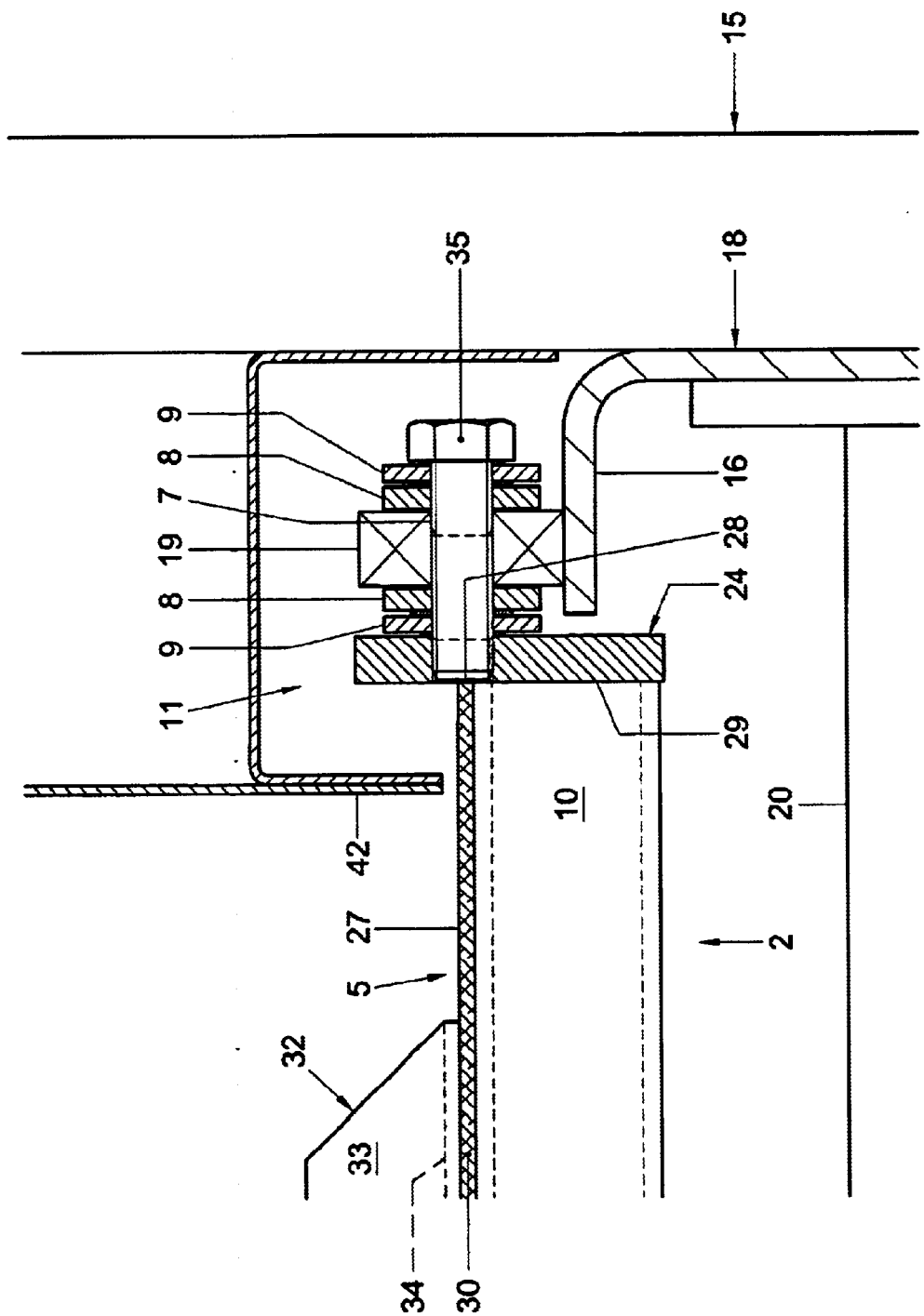
FIG. 3 is an enlarged and more detailed view of a portion of FIG. 2.

The invention is first described with reference to a presently most preferred exemplary embodiment shown in FIGS. 1–10. Dependent on transport requirements and operating circumstances, features such as dimensions and configuration of the transport path may vary. In various instances where the conveyor as shown includes larger numbers of mutually identical parts or portions, for the sake of clarity of the drawings, only a limited number of the parts or portions are designated by reference numerals.

The chain conveyor 1 shown in FIGS. 1–10 has an endless conveyor loop 2 extending over sprocket wheels 3, 4 on opposite ends of the conveyor 1. The conveyor loop 2 has a momentarily upper section 5 forming a transport deck extending along a transport path and a momentarily lower return section 6 extending under the transport deck 5.

The conveyor loop 2 includes two chain arrays each composed of chain pins formed by bolts 7 transverse to the chain array and connections in the form of chain plates 8, 9 extending in longitudinal direction of the array and interconnecting the chain bolts 7. The conveyor loop 2 further includes an array of carrier beams 10 extending in a direction transverse to the array Although it is in principle possible to provide a chain having an array of pins and chain plates on one side only—the transport deck preferably being oriented horizontally or sloping down towards the chain array when seen in cross-section—it is preferred to provide the conveyor loop with chain arrays along both lateral sides of the conveyor loop 2 and interconnected by the carrier beams 10, as in the present example to provide a stable support for the conveyor loop 2.

In order to keep material which is deposited and transported on the transport deck section 5 of the conveyor loop 2 from falling over the side of the conveyor loop 2, a side barrier 11 is provided which extends above and along a side of the transport deck 5.

The conveyor further includes a support structure with adjustable legs 12–15, guide rails 16, 17 for rollers 19 of the chain 2 and transverse beams 20, some of which interconnect U-shaped beams 18 of which flanges form the guide rails 16, 17 and others of which interconnect frame portions 21 (FIG. 8), 22 (FIG. 9) specifically adapted for interconnecting conveyor sections having mutually different sloping angles. The conveyor loop 2 extends through a tunnel-shaped housing 23. For driving the circulation of the conveyor loop 2, a drive unit 25 is provided which is coupled to the sprocket wheel 3 via an axis 26. A motor may be included in the drive unit 25 or power may be obtained from an external drive motor.

The side barrier 11 is formed by an array of side barrier plates 24 which are each fixedly connected relative to central axes of a pair of successive ones of the bolts 7. Successive ones of the side barrier plates 24 are connected relative to successive pairs of the bolts 7 and leading and trailing ends of successive side barrier plates 24 are in close proximity of each other (distance preferably less than 10 mm and more preferably less than 1 to 5 mm) so that in operation very little or no bulk material falls over the side edges of the conveyor loop 2. If the bulk material to be transported is particularly fine grained, the end portions of successive side barrier plates 24 are preferably continuously in contact with each other.

In operation, the side barrier plates 24 move along with the conveyor loop, so that friction and wear due to relative movement between contacting portions of the conveyor loop 2 or material transported thereon and the side barrier 11 is substantially reduced. Furthermore, the side barrier plates 24 do not move substantially in longitudinal direction relative to material which is being transported by the conveyor loop, so that a possible source of dislodgement of material travelling on the transport deck 5 is essentially eliminated.

Compared with conveyor belts of the trough type, the proposed conveyor is particularly advantageous if the transport deck has sections extending at different sloping angles. Because the side barrier 11 is composed of an array of side barrier plates, 24 the position of each of the side barrier plates 24 being determined by a successive pair of the bolts 7, the side barrier 11 can easily accommodate to a great variety of curvatures to which the conveyor loop 2 is subjected in operation. This can be seen particularly clearly in FIGS. 4, 7 and 10. Furthermore, because the relative movability of successive side barrier plates corresponds to the relative movability of the links of the chain the side barrier plates 24 can be made of substantially rigid material such as steel. Accordingly, a particularly robust and durable construction can be obtained.

In order to avoid the formation of gaps between the side barrier plates 24 and the transport deck 5 where the direction of the conveyor loop 2 changes, such as at the sprocket wheels 3, 4 and where the sloping angle of the transport track changes, while nevertheless not substantially impeding the relative movability of the successive side barrier plates 24, the conveyor loop 2 has a material carrying surface 27 having side edges 28 facing the side barrier plates 24. This allows sections of the material carrying surface 27 between successive carrier beams 10 to move freely relative to the side barrier plates 24 over some distance transverse to a plane in which the material carrying surface 27 extends without causing the formation of a substantial gap. Surfaces 29 (see FIGS. 3 and 5) of successive side barrier plates 24 facing the side edges 28 extend in a common plane, which facilitates ensuring that the material carrying surface 27 links-up closely to the side barrier plates 24 also in curved sections of the conveyor loop 2

To ensure that also small particles are effectively kept from falling from the conveyor loop 2, the side edges 28 of the material carrying surface 27 abut the side barrier plates 24.

The abutment of the side edges 28 against the inner surfaces 29 of the side barrier plates is obtained in a particularly simple and reliable manner by providing that the side edges 28 of the material carrying surface 27 slightly press against the side barrier plates 24. In the present example this is achieved by providing that the material carrying surface 27 is the surface of a resilient, rubber belt 30 having a width in uncompressed state which is slightly larger than the distance between side barrier plates 24 on opposite sides of the carrier beam 10. Since the distance in transport direction between successive carrier beams is substantially smaller than the width of the transport deck, gaps between the side barrier plates 24 and the material carrying surface 27, due to sagging of the material carrying surface under the weight of the transported material, will generally not occur. However, if necessary, for instance stiffening busks and/or high modulus fiber reinforcements oriented for instance longitudinally or transversely can be incorporated in the web material 30 to counteract sagging of the material carrying surface 27.

The flexible belt 30 is carried by the carrier beams 10 and mounted to the carrier beam by clamping between a strip 31, 32 and the carrier belt, the strips 31, 32 being bolted to the carrier beams 10. The strips 32 mounted to each second carrier beam 10 each have a flange 33 forming a material entrainer projecting from a foot 34 of the strip 32, the belt 30 being clamped between the foot 34 of the strip 32 and the carrier beam 10. Thus, the function of mounting the belt 30 to the carrier beams 10 and providing a projection for entraining material on the belt, for instance during the ascent along a sloping section of the transport track, are efficiently combined.

In the present example, the fixed position of each of the side barrier plates 24 relative to the two axes 35 (see FIG. 3) of the associated bolts 7 is obtained in a particularly efficient manner, because the bolts 7 are directly connected to the side barrier plates 24. Accordingly, the bolts 7 fulfil both the functions of forming hinges of the respective chain array and of providing connections between the chain array and the central area of the conveyor loop 2 for carrying bulk material.

In turn, the side barrier plates 24 are directly connected to opposite ends of the transverse carrier beams 10, so that the side barrier plates 24 fulfil both the function of restraining bulk material against falling off the transport deck and of connecting the transverse carrier beams 10 to the chain arrays.

The bolts 7 have threaded ends threaded in threaded bores in the side barrier plates 24 allowing the chain arrays to be connected to the side barrier plates 24 in a simple manner and allowing separate replacement of both the central load carrying area of the conveyor loop 2 and the chain arrays. Axial retention of the pins in the bores can also be achieved in other manners, such as by a clamp fitting or a by a locking pin extending transversely to the respective pin.

The bolts 7 abut end faces of the carrier beams 10 attached to the side barrier plates 24 so that the depth over which the bolts 7 can be screwed into the side barrier plates 24 is limited without the need of drilling blind holes in the side barrier plates 24 or providing specific measures to limit the depth over which the bolts 7 can be screwed into the side barrier plates 24.

Figure 4:
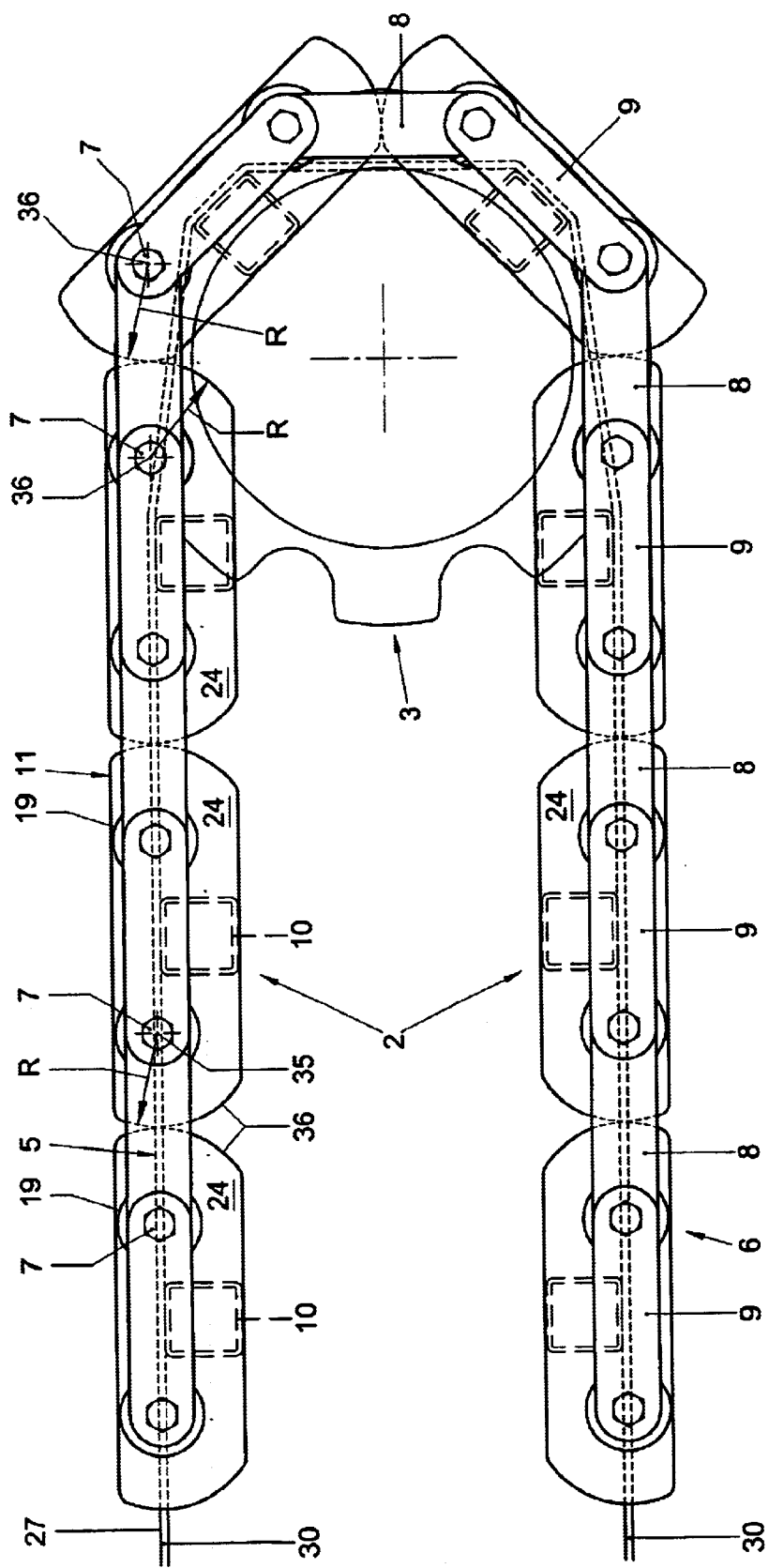
FIG. 4 is a schematic representation of the chain of the conveyor according to FIGS. 1–3.
Figure 5:
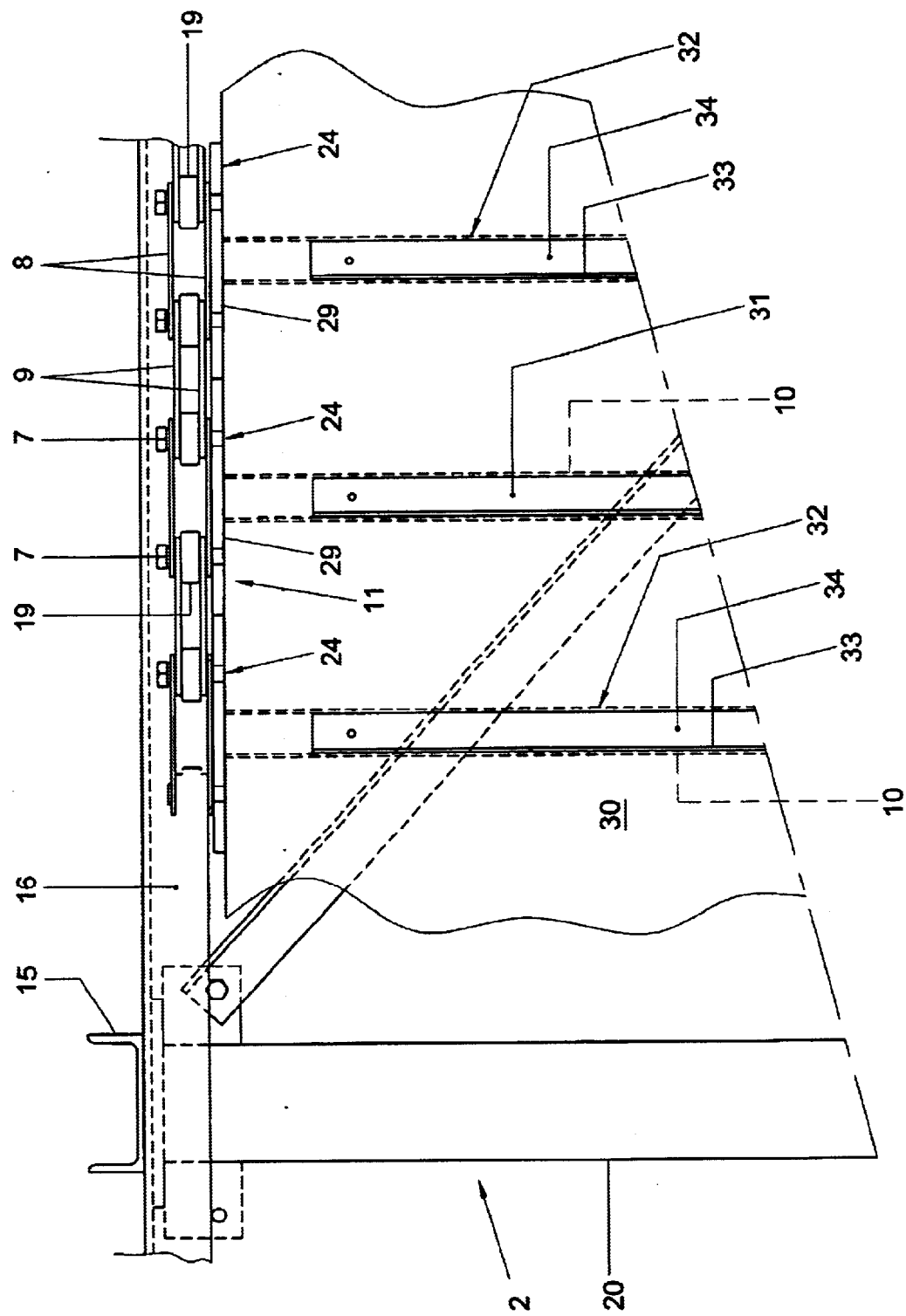
FIG. 5 is a top plan view in cross-section along the line V—V in FIG. 1 of a portion of a transport deck of the conveyor according to FIGS. 1–4.
Figure 6:
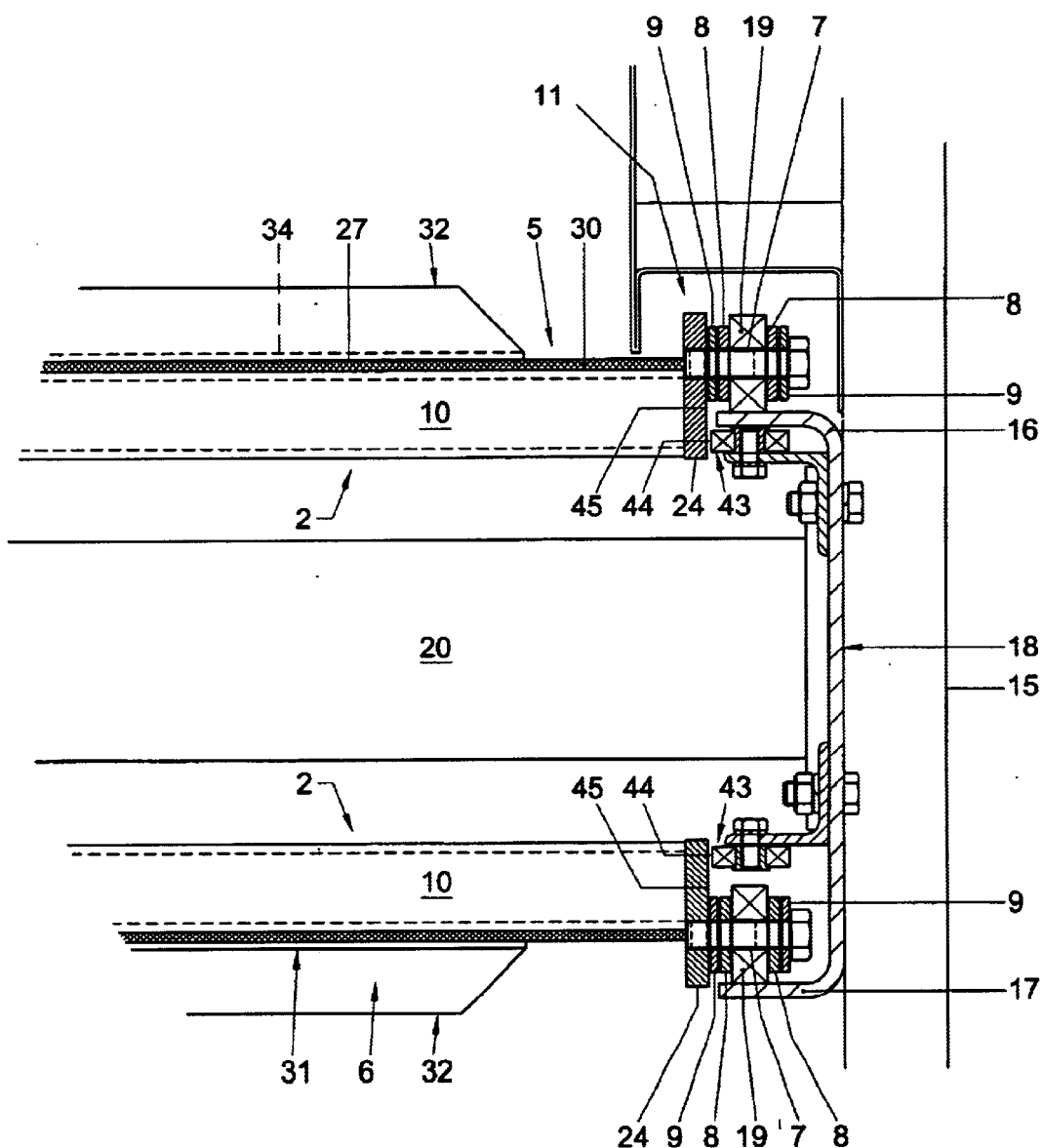
FIG. 6 is a partial frontal view in cross-section along the line VI—VI in FIG. 1.

As can be seen particularly clearly in FIGS. 4, 7 and 10, end faces 36 of the side barrier plates 24 facing each other are each curved with a radius R (FIG. 4) about axes 35 of a most adjacent one of the bolts 7 fixedly connected relative to the respective one of the side barrier plates 24. Due to this shape of the end faces 36 of the side barrier plates 24, successive side barrier plates 24 remain in the same close proximity, or in contact with each other, both during passage along a straight transport track section and when the respective portion of the conveyor loop 2 passes through a curved track portion, for instance at the end of the conveyor (see FIG. 4) or where the transition toward a different sloping angle is made (FIGS. 7 and 10).

To further reduce the risk of material inadvertently falling over the side of the transport deck 5, the conveyor 1 is provided with substantially stationary side guards 42 extending in longitudinal direction of the conveyor loop 2 and suspended above the transport deck on a side of the side barrier plates 24 facing away from the bolts 7 and the chain array.

The carrier rollers 19 supported by guide tracks 16 and carrying the bolts 7 provide a simple construction for smoothly guiding the conveyor loop along the transport track.

To laterally guide the conveyor loop 2, the conveyor further includes guide rollers 43 (see FIGS. 1 and 6) mounted in stationary positions (see FIG. 1) and having circumferential surfaces 44 facing surfaces 45 of the side barrier plates 24 facing away from the carrier beams 10. Thus, the side barrier plates 24 also contribute to lateral guidance of the conveyor loop 2.

FIGS. 7–10 further illustrate the construction of the side plates 21, 22 which is specifically adapted for leading the conveyor loop 2 through a transition to a section of the conveyor 1 having a different sloping angle. In FIGS. 7 and 8, the plate 21 carries curved upper and lower guide ridges 46–49 between which the rollers 19 are guided through the curved transitions between sections having different sloping angles. In FIGS. 9 and 10, the plate 22 carries curved guide ridges 50, 51 over which the rollers 19 are run through the curved transitions between sections having different sloping angles.

From the above description it will be clear to the skilled person that within the framework of the present invention, many variations based on the proposed examples are possible. The bolts 7 can for instance be connected by any suitable type of string members, such as a toothed belt or a wire instead of by chain plates as provided according to the present examples. Guidance of the cham can for instance be achieved by a series of stationary, rotatable sprocket wheels instead of, as shown, by guide rails over which rollers can pass.

As is illustrated by FIGS. 11 and 12, the passage of material in-between opposing end faces 36 of the side barrier plates 24 can also be counteracted in different manners, for instance by providing successive side barrier plates 124 projecting past each other and having co-operating recesses 137, 138 and projections 140, 141. Such side barrier plates of a more complex design are preferably manufactured by casting or moulding.

What is claimed is:

1. A conveyor for conveying bulk material comprising:

a conveyor loop having a momentarily upper section forming a transport deck extending along a transport path and a momentarily lower return section extending under said transport deck, said conveyor loop including at least one array of pins and connections, each of said connections extending in longitudinal direction of said array and interconnecting said pins, and an array of carrier beams, each of said carrier beams extending transverse to said array of pins and connections;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, each successive side barrier plate being connected to a next pair of successive ones of said pins, and leading and trailing end portions of successive ones of said side barrier plates being in at least close proximity of each other for keeping bulk material from passing in-between said end portions.

2. A conveyor according to claim 1, wherein the conveyor loop further comprises a material carrying surface having at least one side edge facing said side barrier plates.

3. A conveyor according to claim 2, wherein said at least one side edge of said material carrying surface abuts said side barrier plates.

4. A conveyor according to claim 2, wherein said material carrying surface is formed by a flexible belt carried by said carrier beams.

5. A conveyor according to claim 1, wherein said side barrier plates are directly connected to ends of the transverse carrier beams.

6. A conveyor according to claim 1, wherein said pins are directly connected to said side barrier plates.

7. A conveyor according to claim 1, wherein said transport deck has sections extending at different sloping angles.

8. A conveyor according to claim 1, further including a substantially stationary side guard extending in longitudinal direction of said transport deck and suspended above said transport deck on a side of said side barrier plates facing away from said pins and said connections of said array of pins and connections.

9. A conveyor according to claim 1, further comprising carrier rollers supported by guide tracks and carrying said pins.

10. A conveyor for conveying bulk material comprising:

a conveyor loop having a momentarily upper section forming a transport deck extending along a transport path and a momentarily lower return section extending under said transport deck, said conveyor loop including at least one array of pins and connections, each of said connections extending in longitudinal direction of said array and interconnecting said pins, and an array of carrier beams, each of said carrier beams extending transverse to said array of pins and connections;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, and leading and trailing end portions of successive ones of said side barrier plates being in at least close proximity of each other for keeping bulk material from passing in-between said end portions, wherein said conveyor loop further includes a material carrying surface formed by a flexible belt carried by said carrier beams and having at least one side edge facing said barrier plate, and mounting elements having a foot, the foot of each mounting element being positioned adjacent the belt, and at least one material entrainer projecting from said foot, said belt being clamped between feet of said mounting elements and said carrier beams.

11. A conveyor for conveying bulk material comprising:

a conveyor loop having a momentarily upper section forming a transport deck extending along a transport path and a momentarily lower return section extending under said transport deck, said conveyor loop including at least one array of pins and connections, each of said connections extending in longitudinal direction of said array and interconnecting said pins, and an array of carrier beams, each of said carrier beams extending transverse to said array of pins and connections;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, and leading and trailing end portions of successive ones of said side barrier plates being in at least close proximity of each other for keeping bulk material from passing in-between said end portions, and wherein the conveyor loop further comprises a material carrying surface having at least one side edge abutting said side barrier plates and pressing against said side barrier plates.

12. A conveyor for conveying bulk material comprising:

a conveyor loop having a momentarily upper section forming a transport deck extending along a transport path and a momentarily lower return section extending under said transport deck, said conveyor loop including at least one array of pins and connections, each of said connections extending in longitudinal direction of said array and interconnecting said pins, and array of carrier beams, each of said carrier beams extending transverse to said array of pins and connections;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, and leading and trailing end portions of successive ones of said side barrier plates being in at least close proximity of each other for keeping bulk material from passing in-between said end portions, and wherein said pins are directly connected to said side barrier plates and axially engage bores in said side barrier plates for axially retaining said pins in said bores.

13. A conveyor for conveying for conveying bulk material comprising:

a conveyor loop having a momentarily upper section forming a transport deck extending along a transport path and a momentarily lower return section extending under said transport deck.

said conveyor loop including at least one array of pins and connections, each of said connections extending in longitudinal direction of said array and interconnecting said pins, and an array of carrier beams, each of said carrier beams extending transverse to said array of pins and connections, wherein ends or said pins abut end faces of said carrier beams;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, and leading and trailing end portions of successive ones of said side barrier plates being in at least close proximity of each other for keeping bulk material from passing in-between said end portions, and wherein said pins are directly connected to said side barrier plates and axially engage bores in said side barrier plates for axially retaining said pins in said bores.

14. A conveyor for conveying bulk material comprising:

a conveyor loop having a momentarily upper section forming a transport deck extending along a transport path and a momentarily lower return section extending under said transport deck, said conveyor loop including at least one array of pins and connections, each of said connections extending in longitudinal direction of said array and interconnecting said pinsk and an array of carrier beams, each of said carrier beams extending transverse to said array of pins and connections;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, and leading and trailing end portions of successive ones of said side barrier plates being in at least close proximity of each other for keeping bulk material from passing in-between said end portions, and wherein said pins are directly connected to said side barrier plates and axially engage bores in said side barrier plates for axially retaining said pins in said bores.

15. A conveyor according to claim 14, said bores having threads and said pins having threaded portions, wherein the threaded portions of said pins engage said threads provided in respective bores of said side barrier plates.

16. A conveyor for conveying bulk material comprising:

a conveyor loop having a momentarily upper section forming a transport deck extending along a transport path and a momentarily lower return section extending under said transport deck, said conveyor loop including at least one array of pins and connections, each of said connections extending in longitudinal direction of said array and interconnecting said pins, and an array of carrier beams, each of said carrier beams extending transverse to said array of pins and connections;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, and leading and trailing end portions of successive ones of said side barrier plates being in at least close proximity of each other for keeping bulk material from passing in-between said end portions, and further comprising guide rollers mounted in substantially stationary positions and having circumferential surfaces facing surfaces of said side barrier plates facing away from said carrier beams.

17. A conveyor for conveying bulk material comprising:

a conveyor loop having a momentarily upper section forming a transport deck extending along a transport path and a momentarily lower return section extending under said transport deck, said conveyor loop including at least one array of pins and connections, each of said connections extending in longitudinal direction of said array and interconnecting said pins, and an array of carrier beams, each of said carrier beams extending transverse to said array of pins and connections;

at least one side barrier extending above and along a side of said transport deck for keeping bulk material from falling over a side edge of said transport deck, wherein said side barrier is formed by an array of side barrier plates, said side barrier plates each being fixedly connected relative to axes of a pair of successive ones of said pins, and leading and trailing end portions of successive ones of said side barrier plates being in at least close proximity of each other for keeping bulk material from passing in-between said end portions, and wherein end faces of said side barrier plates facing each other are each curved about the axis of a most adjacent one of the pins fixedly connected relative to the respective one of said side barrier plates.

\* \* \* \* \*

UNITED STATES PATENT AND TRADEMARK OFFICE
CERTIFICATE OF CORRECTION

PATENT NO. : 6,702,104 B2
DATED : March 9, 2004
INVENTOR(S) : Heiman Salle Bollegraaf It is certified that error appears in the above-identified patent and that said Letters Patent is hereby corrected as shown below:

<u>Title page,</u>
Item [57], ABSTRACT,
Line 9, after "off the", please insert therefor -- transport deck (5) --.

<u>Column 8,</u>
Line 10, please delete "." and insert therefor -- , --.
Line 41, please delete "pinsk" and insert therefor -- pins, --.

Signed and Sealed this

Thirty-first Day of August, 2004

JON W. DUDAS
*Director of the United States Patent and Trademark Office*